(12) United States Patent
Kidokoro et al.

(10) Patent No.: US 6,578,053 B1
(45) Date of Patent: Jun. 10, 2003

(54) DOCUMENT MANAGEMENT SYSTEM AND DOCUMENT MANAGEMENT METHOD APPLIED THERETO

(75) Inventors: Kazuaki Kidokoro, Yokohama (JP); Nobuhisa Yoda, Kamakura (JP); Hiroshi Watanabe, Kawasaki (JP); Shiro Takagi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/257,041

(22) Filed: Feb. 25, 1999

(30) Foreign Application Priority Data

Feb. 27, 1998 (JP) ............................................ 10-047908

(51) Int. Cl.⁷ .......................... G06F 12/00; G06F 17/30
(52) U.S. Cl. ........................ 707/201; 707/10; 707/203; 707/500.1
(58) Field of Search ................. 707/204; 709/217, 709/219; 705/52–54; 713/164–166, 187, 200–203

(56) References Cited

U.S. PATENT DOCUMENTS

| | | | | |
|---|---|---|---|---|
| 5,008,853 A | * | 4/1991 | Bly et al. | 345/331 |
| 5,051,891 A | * | 9/1991 | MacPhail | 707/200 |
| 5,063,495 A | * | 11/1991 | MacPhail | 707/500 |
| 5,142,678 A | * | 8/1992 | MacPhail | 707/500 |
| 5,144,557 A | * | 9/1992 | Wang et al. | 707/9 |
| 5,210,866 A | * | 5/1993 | Milligan et al. | 714/6 |
| 5,220,657 A | * | 6/1993 | Bly et al. | 711/152 |
| 5,530,520 A | * | 6/1996 | Clearwater | 399/366 |
| 5,629,981 A | * | 5/1997 | Nerlikar | 380/25 |
| 5,671,282 A | * | 9/1997 | Wolff et al. | 380/25 |
| 5,742,807 A | * | 4/1998 | Masinter | 707/1 |
| 5,754,308 A | * | 5/1998 | Lopresti et al. | 358/403 |
| 5,799,318 A | * | 8/1998 | Cardinal et al. | 707/104 |
| 5,813,009 A | * | 9/1998 | Johnson et al. | 707/100 |
| 5,828,375 A | * | 10/1998 | Nomura et al. | 345/339 |
| 5,873,077 A | * | 2/1999 | Kanoh et al. | 370/352 |
| 5,893,908 A | * | 4/1999 | Cullen et al. | 707/5 |
| 5,898,836 A | * | 4/1999 | Freivald et al. | 707/513 |
| 5,978,477 A | * | 11/1999 | Hull et al. | 380/9 |
| 6,047,313 A | * | 4/2000 | Hashimoto et al. | 709/203 |
| 6,088,707 A | * | 7/2000 | Bates et al. | 707/501.1 |
| 6,141,665 A | * | 10/2000 | Hara et al. | 705/1 |
| 6,219,818 B1 | * | 4/2001 | Freivald et al. | 707/1 |
| 2002/0186257 A1 | * | 12/2002 | Cadiz et al. | 345/838 |

FOREIGN PATENT DOCUMENTS

JP 03-288265 A * 12/1991 ............ G06F/15/40

OTHER PUBLICATIONS

Kappel et al., "Hypermedia Document and Workflow Management Based on Active Object–Oriented Databases", Proceedings of the 30th Hawaii International Conference on System Science, vol. 4, Jan. 7–10, 1997, pp. 377–386.*

(List continued on next page.)

Primary Examiner—Jean R. Homere
Assistant Examiner—Luke S Wassum
(74) Attorney, Agent, or Firm—Finnegan, Henderson, Farabow, Garrett & Dunner, L.L.P.

(57) ABSTRACT

A document management system records an operation history associated with an electronic document. When output of a document is instructed, it is determined whether an output history associated with the document exists in the recorded operation history. When it is determined that the output history associated with the document exists, a user is informed of the fact that the document has already been output, who output the document in the past, and when the document was output. The following operation errors can be prevented. That is, a specific document is repeatedly output by a plurality of users, and each operation is repeatedly performed.

10 Claims, 6 Drawing Sheets

OTHER PUBLICATIONS

Backer, Andreas, and Busback, Uwe, "DocMan: A Document Management System for Cooperative Support", Proceedings of the 29th Annual Hawaii International Conference on System Sciences, Jan. 3–6, 1996, pp. 82–91.*

Buyukkokten et al., "Document Management in HALdoc", Proceedings of the 7th Mediterranean Electrotechnical Conference, Apr. 12–14, 1994, pp. 379–382.*

Davis et al., "Towards an Integrated Information Environment with Open Hypermedia Systems", Proceedings of the ACM Conference on Hypertext, Nov. 30–Dec. 4, 1992, pp. 181–190.*

Sumiya, Sugao, and Saito, Takashi, "Development of a Multimedia Document Management System for Cooperative Work Environment", Proceedings of the 16th Annual International Computer Software and Applications Conference, Sep. 21–25, 1992, pp. 346–355.*

Fish et al., "Quilt: a Collaborative Tool for Cooperative Writing", ACM/SIGOIS and IEEECSTC–OA Conference on Office Information Systems, Mar. 23–25, 1988, pp. 30–37.*

Cadiz, J.J. et al. "Sideshow: Providing Peripheral Awareness of Important Information", Microsoft Research Technical Report MSR–TR–2001–83, Sep. 14, 2001.*

Sohlenkamp, M., Fuchs, L. and Genau, A. "Awareness and Cooperative Work: The POLITeam Approach", Proceedings of the $30^{th}$ Hawaii International Conference on Systems Sciences, pp. 549–558 v.2, Jan. 7–10, 1997.*

Wiil, U.K. and Leggett, J.J. "Concurrency Control in Collaborative Hypertext Systems", Proceedings of the $5^{th}$ ACM Conference on Hypertext, pp. 14–24, Nov. 1993.*

Dourish, P. and Bellotti, V. "Awareness and Coordination in Shared Workspaces", Proceedings of the 1992 ACM Conference o Computer–Supported Cooperative Work, pp. 107–114, Nov. 1992.*

Leland, M.D.P., Fish, R.S. and Kraut, R.E. "Collaborative Document Production Using Quilt", Proceedins fo the 1988 ACM Conference on Computer–Supported Cooperative Work, pp. 206–215, Jan. 1988.*

Brush, A.J. et al. "Notification for Shared Annotation of Digital Doucments", Proceedings of the 2002 SIGCHI Conference on Human Factors and Computing Systems, Apr. 20–25, 2002, pp. 89–96.*

Appelt, W. "What Groupware Functionality Do Users Really Use? Analysis of the Usage of the BSCW System", Proceedings o the $9^{th}$ Euromicro Workshop on Parallel and Distributed Processing (PDP2001), Feb. 7–9, 2001.*

Burns, B. "Moving Document Control Systems to the Corporate Intranet: One Company's Strategy", Proceedings of the $15^{th}$ Annual International Conference on Systems Documentation, Oct. 1997, pp. 11–16.*

Bentley, R. et al. "Basic Support for Cooperative Work on the World Wide Web", International Journal of Human Studies: Spec issue on Novel Applications of the WWW, Spring 1997, pp. 827–846.*

* cited by examiner

| OPERATION TYPE | DOCUMENT NAME | OPERATION DATE | USER NAME | STORAGE/TRANSMISSION DESTINATION |
|---|---|---|---|---|
| CREATION | C:\text\DOCUMENT B.doc | 1997/12/24 10:20:10 | USER 1 | |
| PRINTING | C:\text\DOCUMENT A.doc | 1997/12/24 10:30:20 | USER 1 | THIRD SHELF OF COMMON RACK |
| PRINTING | C:\text\DOCUMENT B.doc | 1997/12/24 10:31:05 | USER 2 | WORK TABLE OF USER 2 |
| UPDATING | F:\dirA\DOCUMENT C.txt | 1997/12/24 10:40:20 | USER 3 | |
| FAX TRANSMISSION | F:\dirB\DOCUMENT D.ppt | 1997/12/24 10:42:15 | USER 2 | USER 4 |
| UPDATING | C:\text\DOCUMENT B.doc | 1997/12/24 11:05:12 | USER 3 | NOTIFY USER 1 |
| BACKUP | C:\dirC\DOCUMENT E.doc | 1997/12/24 11:30:15 | USER 2 | DRAWER OF COMMON RACK |
| PRINTING | C:\dirC\DOCUMENT E.doc | 1997/12/24 11:35:20 | USER 1 | SHELF #41 OF LIBRARY |
| MAIL TRANSMISSION | C:\dirC\DOCUMENT F.doc | 1997/12/24 11:40:10 | USER 3 | USER 5 |
| a | b | c | d | e |

DOCUMENT MANAGEMENT SYSTEM AND DOCUMENT MANAGEMENT METHOD APPLIED THERETO

BACKGROUND OF THE INVENTION

The present invention relates to a document management system having a function of recording operation history associated with documents in order to execute document utilization support for users, such as operation procedure guide associated with documents, and a document management method applied to this system.

This application is based on Japanese Patent Application No. 10-47908 filed on Feb. 27, 1998, the contents of which are incorporated herein by reference.

Jobs using electronic documents have been common in offices in these days due to widespread large-capacity memory devices, networks, and the like. The degrees of efficiently taking necessary information from a large number of documents and effectively handling documents greatly influence the efficiency of business operations.

A conventional file management method using a tree structure is insufficient in retrieval function for electronic documents. To complement this function, there have been developed a large number of document management application programs for improving jobs efficiency, such as a full-text retrieval tool using a keyword and a work flow system for improving jobs efficiency by defining a job document flow.

While satisfactory results have been obtained by these application programs, functions which cannot be covered by these application programs to perform jobs have been necessary. For example, no retrieval can be performed in the above-mentioned full-text retrieval tool when a user cannot think of a keyword for retrieving included in a target document. No work flow system can handle a document whose utilization method is not clearly defined.

For example, as disclosed in Japanese Patent Application Nos. 9-189927 and 9-189928, an application program has been introduced to support jobs using the user operation history associated with documents. By using the user operation history, the user can access a necessary document referred to by himself in the past without requiring a keyword if the user specifies the date at which the user referred to the document and its purpose. The user can also utilize the user operation history to derive the flow of this document.

A conventional document management system, however, concentrates its purpose on managing documents in the system. For this reason, another management system is required to manage documents such as printed paper documents outside the system. The user must manage both electronic documents and paper documents.

An example of using operation history for output document management is disclosed in Japanese Patent Application KOKAI Publication No. 9-30057. The name of user who has instructed printing is added to data of printing, and the history of printing is managed using a printer driver. The number of pages printed and output by this user is managed. This history of printing is, however, managed by the printer driver directly connected to a specific printer. Therefore, a system to which a plurality of printers are connected cannot manage outputs. The electronic documents in the system do not have information associated with paper documents. Therefore, even if a document is updated in the system, the user does not know whether the paper document must be updated.

BRIEF SUMMARY OF THE INVENTION

It is the first object of the present invention to provide a document management system which can remarkably improve utility by positively using an operation history associated with electronic documents in the system to manage documents such as external paper documents output from the system.

It is the second object of the present invention to provide a document management method applied to the document management system.

The first object can be achieved by the following document management system. That is, a document management system records an operation history associated with an electronic document and determines whether an output history associated with the document exists in the recorded history when output of the document is instructed. When it is determined that the output history associated with the document exists, the document management system notifies a user of the fact that the document has already been output, who output the document in the past, and when the document was output.

The second object can be achieved by the following document management method applied to the document management system. That is, a document management method records an operation history of an electronic document and determines whether an output history associated with the document exists in the recorded operation history when output of the document is instructed. When it is determined that the output history associated with the document exists, the document management system notifies a user of the fact that the document has already been output, who output the document, and when the document was output.

According to the present invention, the following errors can be easily prevented. That is, a specific document is repeatedly output by a plurality of users, and a specific operation is repeatedly performed. The present invention also allows each user to recognize other users who have output a document in the past. For example, when the document has been updated, the user can notify other users of this or specify an adviser from them. In addition, easy-going document output can be suppressed.

The present invention accepts an input of the storage place of a portable recording medium serving as an output destination of an electronic document together with an output instruction when the document is output. A storage place is determined for each portable recording media to which electronic documents are to be output. The storage place of the portable recording medium serving as an output destination of the document is managed in correspondence with the output document when the document is output. For example, when a document output instruction is made, the user is notified of the corresponding storage place.

According to the present invention, the electronic documents in the system and the documents on the portable recording medium outside the system can be unifiedly managed.

According to the present invention, when a document has been updated, it is determined whether the output history associated with the document exists in the operation history recorded in advance. If it is determined that the output history associated with the document exists, other users who have output the document in the past are notified of the fact that the document has been updated.

According to the present invention, the users who have output the document in the past can instantaneously be informed of the fact that the document has been updated.

According to the present invention, when a document has been updated, the name of user who input the document is determined from the operation history recorded in advance. The determined user is notified of the fact that the document has been updated.

According to the present invention, the user who input the document can instantaneously be informed of the fact that the document has been updated.

As described above, according to the present invention, the output history of documents output outside the system can be provided to users. Necessity of document replacement due to updating associated with the output document can be notified. Management of storage place of the output documents can be unified with the system, and utility of the system can be remarkably improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the accompanying drawing.

Figure 1:
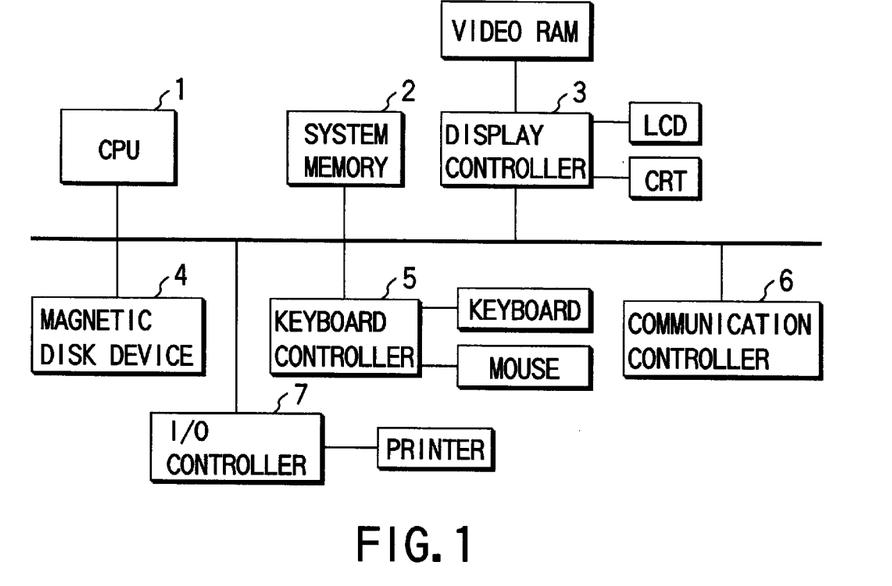
FIG. 1 is a block diagram showing the arrangement of a document management system according to an embodiment of the present invention.

FIG. 1 is a block diagram showing the arrangement of a document management system according to an embodiment of the present invention.

As shown in FIG. 1, this system comprises a CPU 1, a system memory 2, a display controller 3, a magnetic disk device 4, a keyboard controller 5, a communication controller 6, and an I/O (Input/Output) controller 7.

The system memory 2 stores programs under execution and control data necessary for executing the programs. The magnetic disk device 4 stores control programs, management data, and an operation history. The CPU 1 controls the overall operation of the system. When the system is activated, the CPU 1 reads out the programs recorded on the magnetic disk device 4, on the system memory 2 and controls in accordance with the contents of the readout programs.

A keyboard or a mouse connected via the keyboard controller 5 is used as an input device for interactive processing with a user. An input operation result is displayed on a display such as an LCD or CRT connected via the display controller 3. A printer as a document output means is connected via the I/O controller 7. The document management system is connected to a network via the communication controller 6 and processes operations input from the network and outputs the processing result to the network. In addition, the document management system can also transmit a document via the network by E-mail or facsimile.

The above components are connected via system buses and controlled by an OS (Operating System) operating under the control of the CPU 1. The functions of the present invention are realized as an application program running on this OS.

Figure 2:
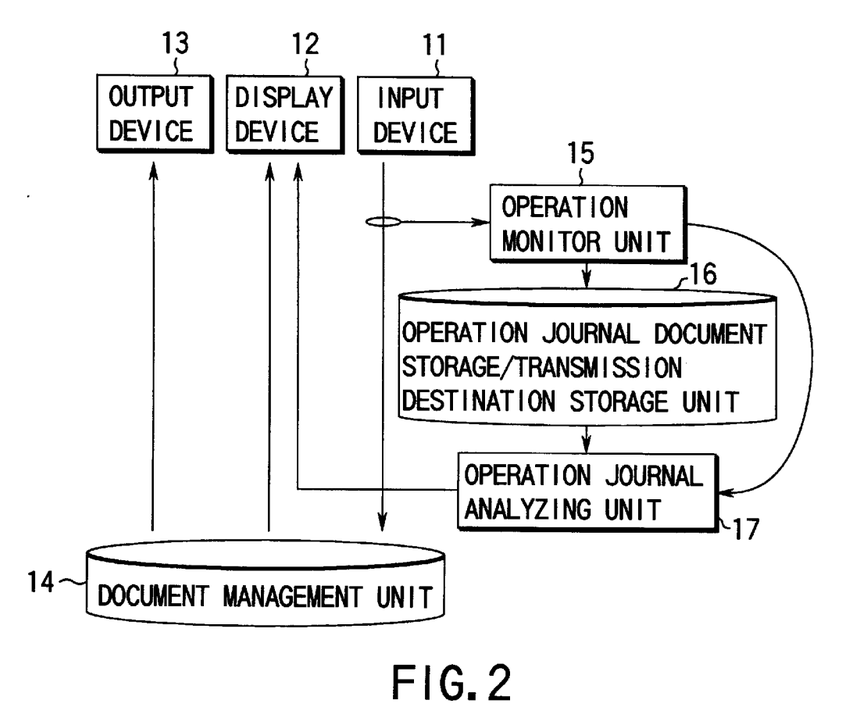
FIG. 2 is a block diagram showing the functions of the document management system of the embodiment.

FIG. 2 shows the functional blocks of the document management system of this embodiment.

An input device 11 is for inputting a user operation to the system and includes a keyboard, a mouse, and a network device. A display device 12 can be a display for displaying an operation result and document on the basis of the user operation. An output device 13 includes a printer, facsimile device, backup device, and network device which output a document outside the system on the basis of the user operation.

A document management unit 14 comprises a usual OS for managing storage areas and controlling the input device 11, the display device 12, and the output device 13. An application program which processes a document is running on the OS. A document is created, edited, and/or referred to, and an operation result is displayed or output to the display device 12 or the output device 13 on the basis of the user operation from the input device 11. The document management unit 14 is functionally identical to the usual OS, and a detailed description thereof will be omitted. The document management unit 14 is extended in order to monitor user operations associated with documents.

An operation monitor unit 15 monitors a user operation input from the input device 11, and extracts processing,data such as creating, updating, and referring to a document, and document output processing data such as transmitting a document by E-mail or facsimile and printing a document. The operation monitor unit 15 stores, as an operation history, an operation target document, in correspondence with operation time, the identifier of a user who made an operation, and the user identifier of a transmission destination in an operation history, document storage/transmission destination storage unit 16.

The operation history, document storage/transmission destination storage unit 16 records the operation history detected by the operation monitor unit 15. An example of operation history data to be recorded is shown in FIG. 3.

Figure 3:
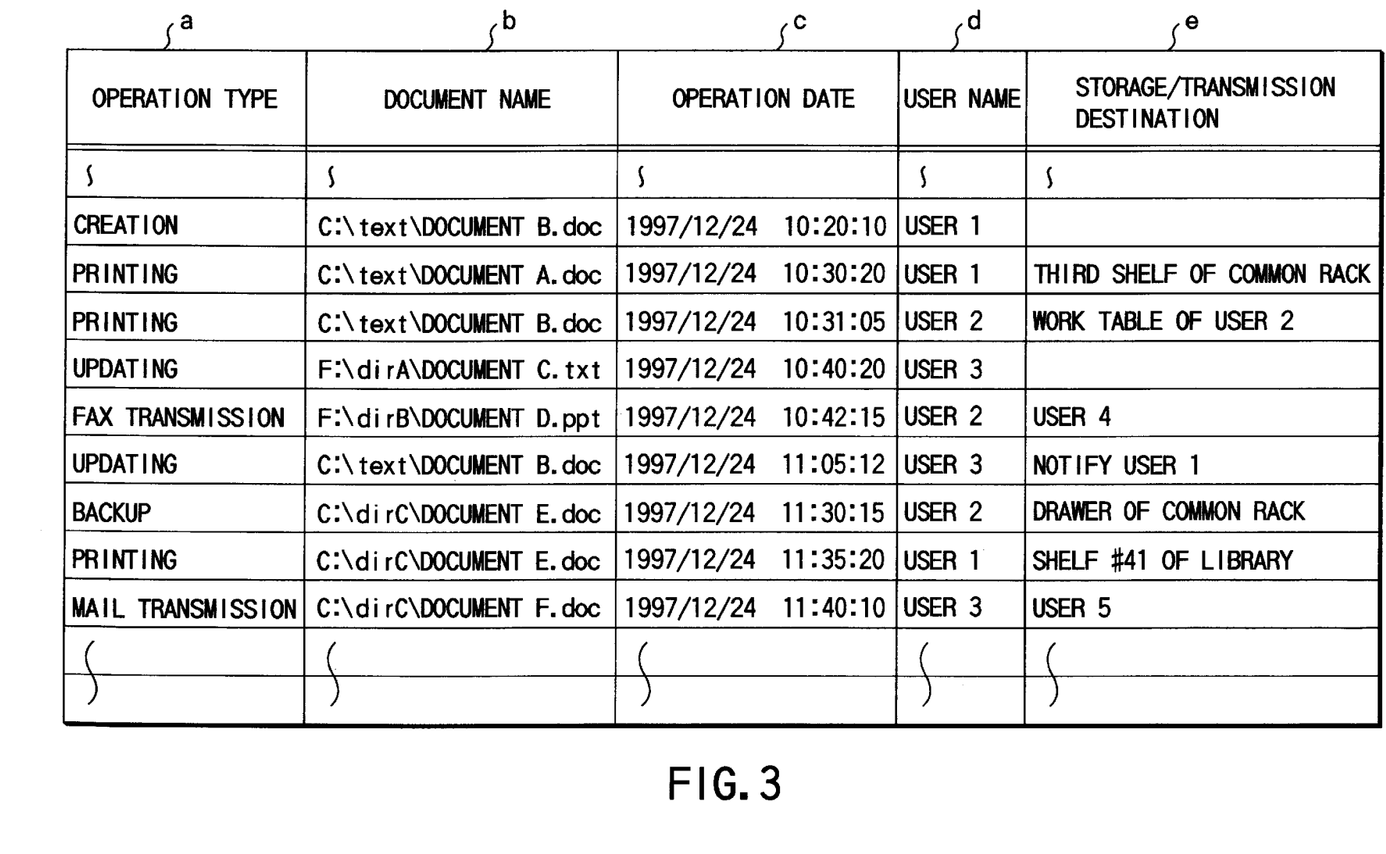
FIG. 3 is a table showing an example of operation history data of the embodiment.

An operation type a in FIG. 3 represents a type of recorded operation history. The items such as "creating", "updating", "referring to", "deleting", "mail transmission", and "backup" are stored in the operation occurrence order in the column a.

A document name b is the document name of an operation target recorded together with the operation history. In the example shown in FIG. 3, the directory names and file names of the OS file system are recorded in the column b.

The date and time of operation are recorded in the column of an operation data c.

A user name d is the identifier of a user who made an operation, which is recorded in the column of a user name d.

A storage place of such as a paper document as a result of printing and a recording medium as a backup result is recorded in the column of a storage/transmission destination e when an operation is printing or backup to the portable recording medium. However, when the operation is to transmit mail or facsimile via the network, the transmission destination of the mail or facsimile is recorded in the column of the storage/transmission destination e. When the operation is to update a document, the name of user who has input and created the document is recorded in the column of the storage/transmission destination e.

An operation history analyzing unit 17 analyzes the operation history recorded in the operation history, document storage/transmission destination storage unit 16 on the basis of the operation made by the user and presents the analysis result to the user.

The operation of the document management system of this embodiment will be described in detail below.

Figure 4:
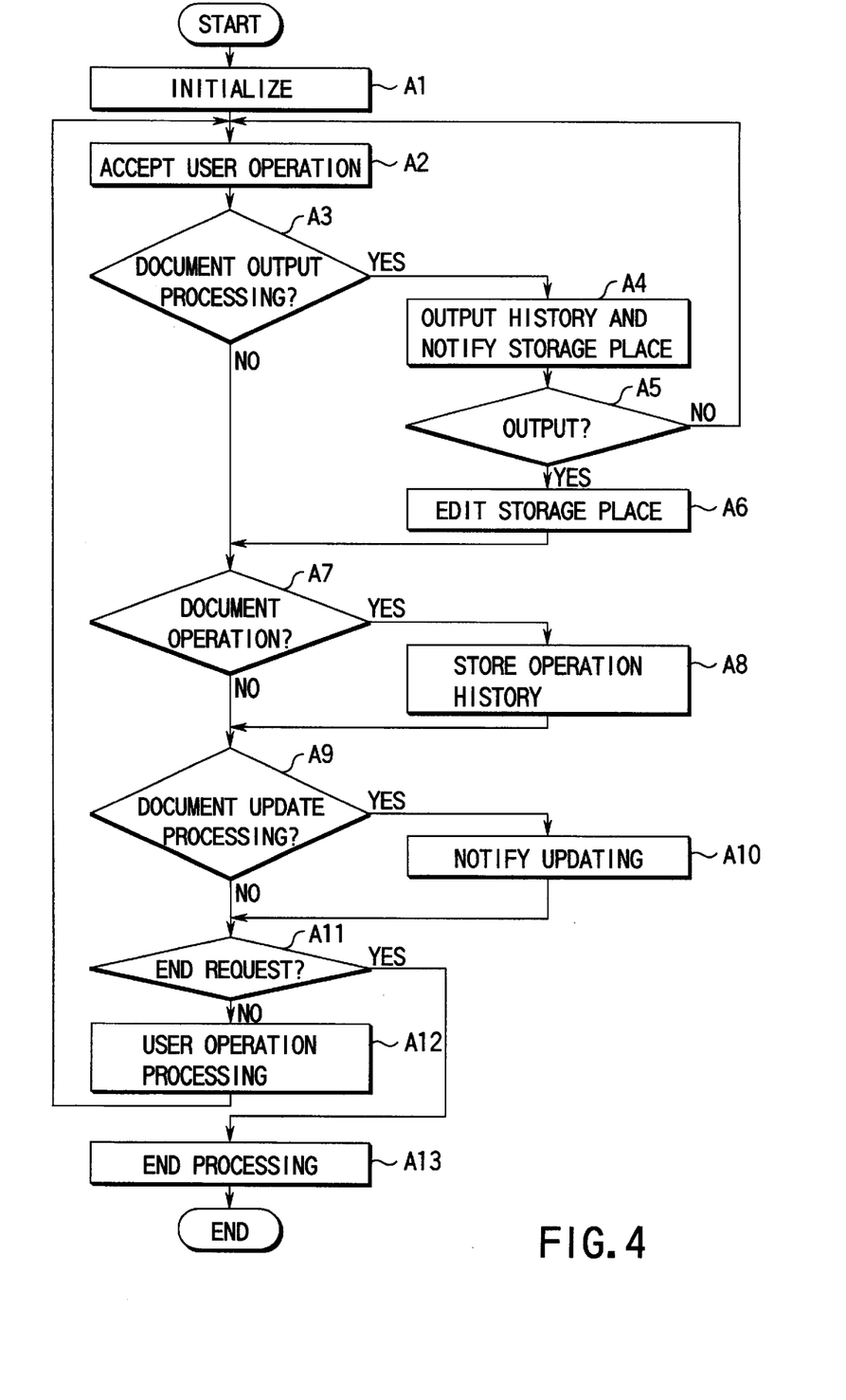
FIG. 4 is a flow chart showing the main flow of the document management system of the embodiment.

FIG. 4 shows the main flow of this document management system.

When the system is activated, the control program stored in the magnetic disk device 4 is read out on the system memory 2 to initialize the system in step A1. Upon completion of initialization, the system accepts a user operation in step A2.

Figure 5:
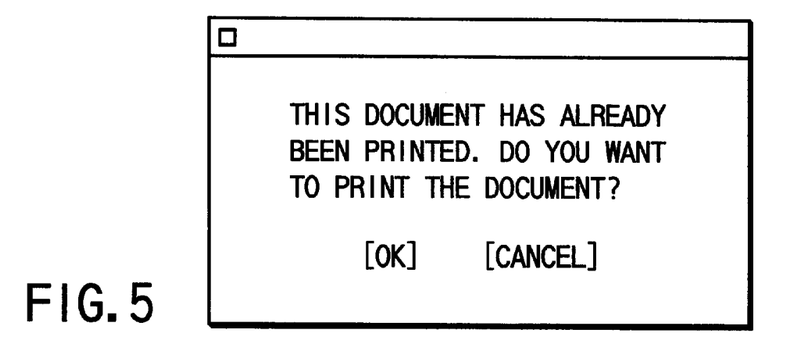
FIG. 5 is a view showing an example of a print history notifying window of the embodiment.
Figure 6:
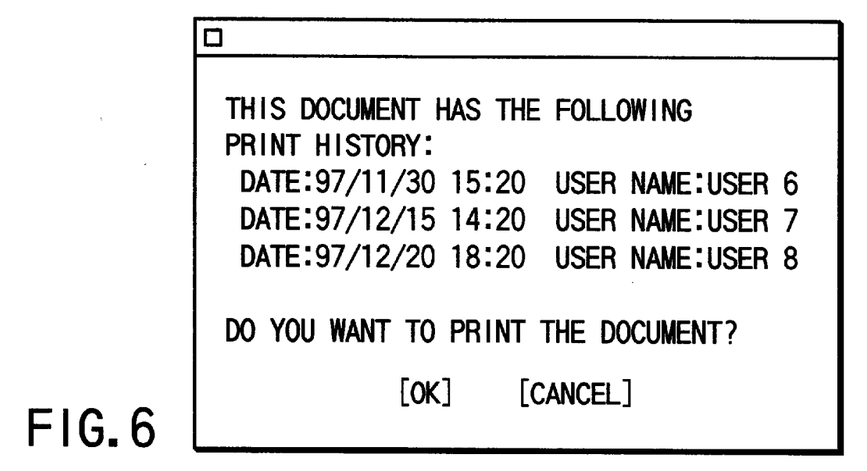
FIG. 6 is a view showing another example of a print history notifying window of the embodiment.

When the user operation is document output processing such as printing, mail/FAX transmission, or backup to the portable recording medium, YES is determined in step A3. The processing contents are recorded in an operation history in step A4. At this time, whether output processing for this document has already been performed is determined in the operation history. If a document instructed by the user for output has already been output, and a history in which the document has been updated between the last output processing and the current output processing is not recorded, the window shown in FIG. 5 is displayed to inform the user of information representing that the document has already printed. If the user name and output date of the past output processing are recorded in the operation history, the window shown in FIG. 6 is displayed to also inform the user of the output history.

Figure 7:
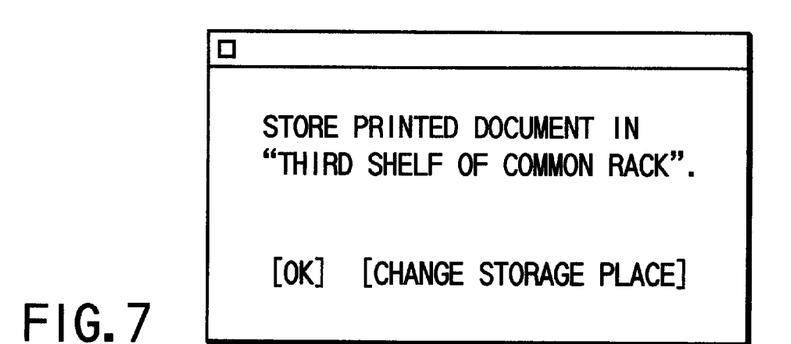
FIG. 7 is a view showing an example of a storage place notifying window of the embodiment.
Figure 8:
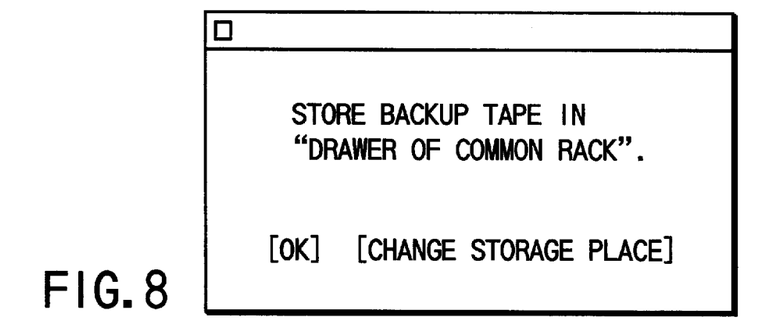
FIG. 8 is a view showing another example of a storage place notifying window of the embodiment.
Figure 9:
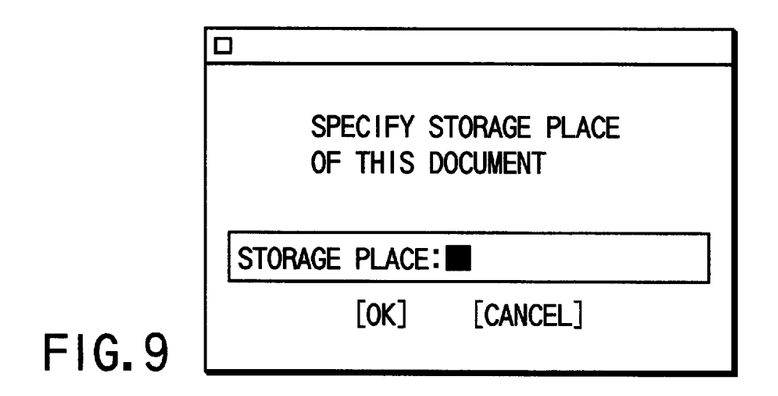
FIG. 9 is a view showing an example of a storage place specifying window of the embodiment.

When a document which has been output to the portable recording medium such as paper or a magnetic tape and whose storage location has been recorded is to be output, YES is determined in step A5. In step A6, the contents recorded in the storage place of the latest output history in the operation history are referred to. A specific storage place of the paper document and magnetic tape as an output result is specified on the window shown in FIG. 7 or 8 to inform the user of the specific storage place. When the past output history is not left on this document, i.e., when the document is output at the first time, the window shown in FIG. 9 is displayed to prompt the user to input the storage place.

Figure 10:
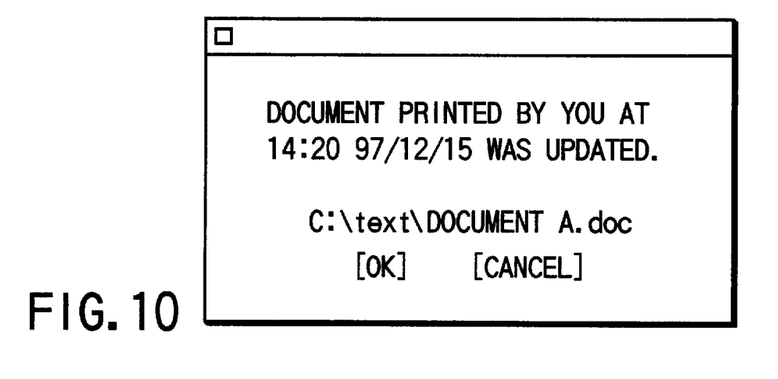
FIG. 10 is a view showing an example of a document update notifying window of the embodiment.
Figure 11:
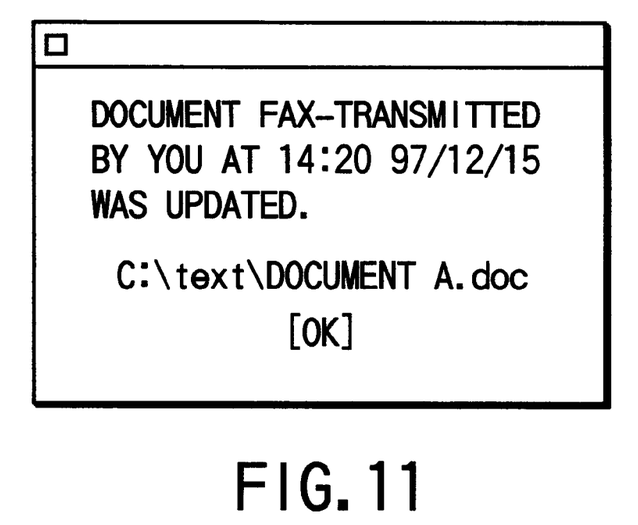
FIG. 11 is a view showing another example of a document update notifying window of the embodiment.
Figure 12:
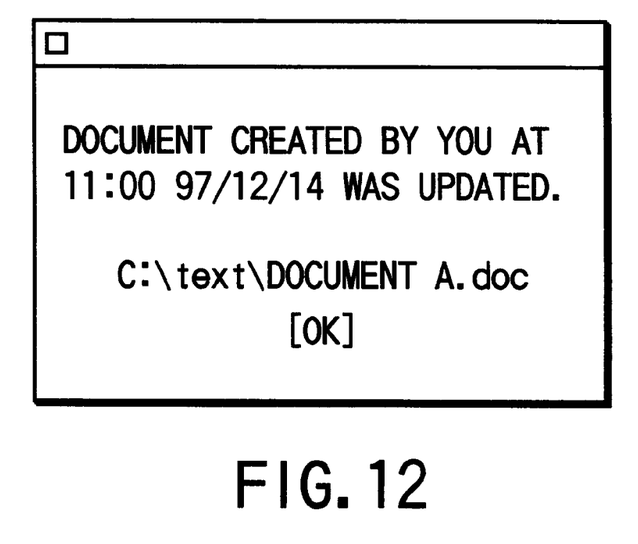
FIG. 12 is a view showing another example of a document update notifying window of the embodiment.

When the user operation is document operation processing, NO is determined in step A3. YES is then determined in step A7. The processing contents are recorded in the operation history in step A8. When the user operation is document update processing, NO is determined in step A7, and then YES is determined in step A9. In step A10, the operation history is searched, and the windows shown in FIG. 10, 11, or 12 are displayed to the user who output the document in the past and the user who input and created the document, thereby informing the users of the fact that the document has been updated.

When the user operation is system end processing, NO is determined in step A9, and then YES is determined in step A11. In step A13, the operation history data and control data are saved in the magnetic disk device 4 to perform system end processing. Otherwise, NO is determined in step A11, and processing corresponding to the user operation is performed in step A12.

As described above, according to the document management system of this embodiment, each user can be notified of whether the document has already been output or when a specific user has output the document. When a certain document is updated, the user who input and created the document and the user who output the document before updating can be notified of updating.

The technique of the present invention can be realized by software. The software can be provided as a program executable by a computer in a computer-readable recording medium such as a floppy disk, optical disk, or semiconductor memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document management system comprising:

operation history storing means for storing an operation history associated with an electronic document, the operation history including an update of the document;

operation history analyzing means for determining whether the document has been updated after the document was output when output of the document is instructed by a user with reference to the operation history, wherein, when a document is output, it is available for manipulation by the user, and wherein such output of the document is in a form other than printing; and informing means for informing the user of the fact that the document has already been output when said operation history analyzing means determines that the document has not been updated after the document was output.

2. The system according to claim 1, wherein said operation history analyzing means determines from the recorded operation history who outputted the document in the past when the output of the document is instructed, and said operation history analyzing means determines that the output history associated with the document exists, and said informing means informs the user who outputted the document, which is determined by said operation history analyzing means.

3. The system according to claim 1, wherein the operation history includes an output destination of an electronic document, the output destination including a storage place or location of a recording medium storing the document;

the operation history analyzing means, when the output of an electronic document to a recording medium is instructed, detects the storage place or location of the recording medium storing the document to be output with reference to the operation history; and the informing means informs the user of the storage place or location of the recording medium storing the document to be output.

4. The system according to claim 3, wherein the informing means prompts the user to input a storage place when it is determined that the output destination does not include the storage place.

5. A document management method applied to a document management system, comprising:

storing step of storing an operation history associated with an electronic document, the operation history including an update of the document;

determination step of determining whether the document has been updated after the document was output when output of the document is instructed by a user with reference to the operation history, wherein, when a document is output, it is available for manipulation by the user, and wherein such output of the document is in a form other than printing; and informing step of informing the user of the fact that the document has already been output when it is determined in the determination step that document has not been updated after the document was output.

6. The method according to claim 5, wherein the determining step determines from the recorded operation history who output the document in the past when the output the of the document is instructed and it is determined the output history associated with the document exists, and the informing step informs the user, who output the document, which is determined in the determining step.

7. The method according to claim 5, wherein the operation history includes an output destination of an electronic document;

the determining step, when the output of an electronic document to a recording medium is instructed, determines whether the output destination includes a storage place of the recording medium; and the informing step informs the user of the storage place when it is determined that the output destination includes the storage place.

8. The method according to claim 7, wherein the informing step prompts the user to input a storage place when it is determined that the output destination does not include the storage place.

9. A document management system comprising:

means for storing an operation history associated with an electronic document, the operation history including an identification data of a user;

operation history analyzing means for, when the document is updated, identifying a user who outputted the document in the past with reference to the operation history, wherein, when a document is output, it is available for further processing by the user, and wherein output of the document is in a form other than printing; and means for informing the user who outputted the document in the past, which is determined by said operation history analyzing means, of the fact that the document has been updated after the user outputted the document.

10. A document management method applied to a document management system, comprising:

storing an operation history associated with an electronic document, the operation history including an identification data of a user;

when the document is updated identifying a user who outputted the document in the past with reference to the operation history, wherein, when a document is output, it is available for further processing, by the user, and wherein output of the document is in a form other than printing; and informing the user who output the document in the past, which is determined in the determination step, of the fact that the document has been updated after the user output the document.

* * * * *

UNITED STATES PATENT AND TRADEMARK OFFICE
CERTIFICATE OF CORRECTION

PATENT NO. : 6,578,053 B1
DATED : June 10, 2003
INVENTOR(S) : Kidokoro et al.

It is certified that error appears in the above-identified patent and that said Letters Patent is hereby corrected as shown below:

<u>Title page,</u>
Item [54], delete the title in its entirety and substitute therefor
-- DOCUMENT MANAGEMENT SYSTEM AND METHOD INCLUDING DOCUMENT OUTPUT NOTIFICATION --.

<u>Column 7,</u>
Line 37, change "output the of" to -- output of --.

Signed and Sealed this

Twenty-fifth Day of November, 2003

JAMES E. ROGAN
*Director of the United States Patent and Trademark Office*